United States Patent [19]

Guerra et al.

[11] Patent Number: 5,468,823
[45] Date of Patent: Nov. 21, 1995

[54] SEMICRYSTALLINE MANUFACTURED ARTICLES MADE OF SYNDIOTACTIC POLY-P-METHYLSTYRENE (S-PPMS)

[75] Inventors: Gaetano Guerra, Salerno; Paolo Corradini; Claudio DeRosa, both of Naples; Mauro Iuliano, Salerno; Leone Oliva; Vittorio Petraccone, both of Naples, all of Italy

[73] Assignee: Montecatini Tecnologie S.p.A., Italy

[21] Appl. No.: 977,445

[22] PCT Filed: Jul. 28, 1992

[86] PCT No.: PCT/EP92/01710

§ 371 Date: Feb. 12, 1993

§ 102(e) Date: Feb. 12, 1993

[87] PCT Pub. No.: WO93/03211

PCT Pub. Date: Feb. 18, 1993

[30] Foreign Application Priority Data

Jul. 29, 1991 [IT] Italy .................................. MI91A2102

[51] Int. Cl.[6] .............................. C08F 112/12; C08J 5/18; C08L 25/16; D01F 6/20
[52] U.S. Cl. .................. 526/347.1; 526/160; 526/348.1; 528/481; 528/491; 528/492; 528/494; 528/503; 524/113; 524/577; 264/289.3; 264/340; 264/345
[58] Field of Search ............................. 526/347.1, 348.1; 528/493, 491, 503, 492, 494, 481; 264/340, 341, 343, 345, 289.3; 524/113, 577

[56] References Cited

U.S. PATENT DOCUMENTS 4,959,435  9/1990  Seitz et al. .................... 526/347.1 X
5,171,834  12/1992  Funaki .................................. 528/493

FOREIGN PATENT DOCUMENTS 0342234  11/1989  European Pat. Off. .
2064141  3/1990  Japan .

OTHER PUBLICATIONS

Gaetano Guerra et al., "Solid-state high-resolution 13C nuclear magnetic resonance spectra of syndiotactic poly(p-methyl-styrene)," *Polymer Communications*, vol. 32, No. 14, pp. 430–432 (1991).

Alfonso Grassi et al., "Reactivity of Some Substituted Styrenes in the Presence of a Syndiotactic Specific Polymerization catalyst," *Macromolecules*, vol. 22, pp. 104–108 (1989).

*Patent Abstracts of Japan*, vol. 14, No. 242 (C–721) May 23, 1990.

Primary Examiner—Fred Teskin
Attorney, Agent, or Firm—Bryan Cave

[57] ABSTRACT

Semicrystalline manufactured articles made of syndiotactic poly-p-methylstyrene (s-PpMS) in a crystalline form having a high melting point (225° C.), and processes for the preparation thereof. Processes for preparing semicrystalline manufactured articles (semi-finished products, formed articles, fibers, films, etc.) made of s-PpMS in its different crystalline forms by exposure of amorphous manufactured articles to suitable solvents and by subsequent thermomechanical treatments.

10 Claims, 7 Drawing Sheets

SEMICRYSTALLINE MANUFACTURED ARTICLES MADE OF SYNDIOTACTIC POLY-P-METHYLSTYRENE (S-PPMS)

The present invention relates to semicrystalline manufactured articles made of syndiotactic poly-p-methylstyrene (s-PpMS) exhibiting very good thermomechanical properties, and to processes for the preparation thereof.

It is known that p-methylstyrene (pMS), in comparison with styrene, is advantageously Obtained starting from toluene instead of benzene (in fact, pMS is primarily prepared by hydrodemethylation of toluene).

Recently, suitably modified zeolitic catalysts have been made available, which allow commercial production of pMS containing only small amounts of m-methylstyrene (mMS). In the past, only 65/35 mMS/pMS mixtures (known as vinyltoluene) were commercially available.

Atactic poly-p-methylstyrene (PpMS), obtained via radical polymerization, exhibits characteristics which are very similar to those of atactic polystyrene and compared to atactic polystyrene has the advantage of a lower density (4% lower), a higher Tg (113° C. against 102° C.) and better mold packing characteristics (lower melt viscosities).

It is also known that isotactic PpMS, obtained by conventional catalyst systems of the Ziegler-Natta type, does not crystallize and is therefore of no practical interest.

In contrast, syndiotactic PpMS obtained by the recently available syndiospecific catalyst systems is, as synthesized, a semicrystalline product having a melting point lower than 195° C. However, said polymer is unable to crystallize either during molding operation or by subsequent annealing of the amorphous manufactured articles obtained therefrom.

It has now been found that it is possible to obtain semicrystalline manufactured articles (semi-finished products, formed articles, fibers, films, etc.) made of s-PpMS. In particular, manufactured articles can be obtained wherein the polymer is in a new crystalline form characterized by a melting point (225° C.) which is higher than the melting point of the known crystalline forms.

The semicrystalline manufactured articles of the invention are obtained by exposure of amorphous manufactured articles to suitable organic solvents and by subsequent thermomechanical treatments.

It has, in fact, been found that amorphous s-PpMS manufactured articles are able to crystallize very rapidly when exposed to a suitable organic solvents, optionally in the form of vapour.

Solvents which are capable of inducing the crystallization of s-PpMS comprise tetrahydrofuran and o-dichlorobenzene as well as dimethylformamide, dimethylacetamide and N-methyl- 2-pyrrolidone. Tetrahydrofuran and ethers which are structurally similar to tetrahydrofuran can induce very fast crystallization processes.

Various crystalline forms are obtained from said solvent treatment depending on the kind of solvent employed, in that the relevant structures usually clathrate molecules of the solvent in their crystal lattice.

BRIEF DESCRIPTION OF THE DRAWINGS

For instance, FIGS. 1A, 1B and 1C respectively show the X-ray diffraction spectra of a sample obtained by compression molding (amorphous sample), and subsequently exposed to tetrahydrofuran vapours or immersed in o-dichlorobenzene.

By annealing samples in the clathrate crystalline forms it is possible, depending on the starting clathrate form and the annealing conditions, to obtain samples in one of the four non clathrate crystalline forms, herein named as I, II, III and IV (the former three are actual crystalline forms, whereas form IV is a mesomorphic form), the X-ray diffraction spectra thereof being shown in FIGS. 2A, 2B, 2C and 2D respectively.

Figure 1:
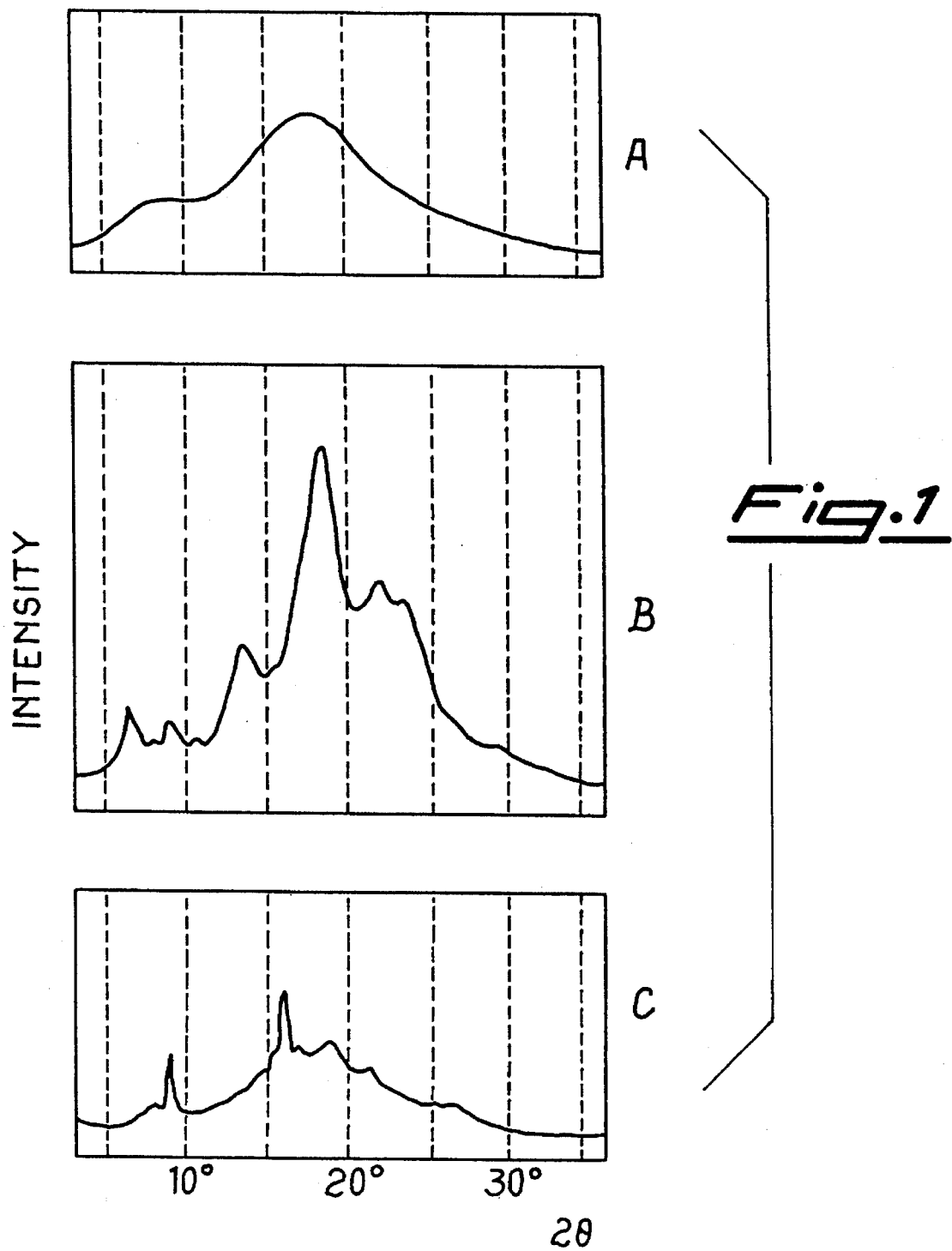

In particular, crystalline forms II, III and IV are stable up to their melting temperatures, which in the case of a highly syndiotactic polymer (fractions of rrrr pentads close to 95%) are 201° C., 224° C. and 194° C. respectively. The herein reported melting temperatures are measured at the peak of the melting endotherm recorded in DSC scans at 10K/min.

Preferably, the S-PpMS employed for preparing the manufactured articles of the invention has a high level of syndiotacticity (fractions of rrrr pentads greater than 85–90%).

The new crystalline form III has the highest melting point and is characterized by X-ray diffraction peaks at $2\theta=7.5°$, $12.8°$, $13.5°$, $16.1°$, $17.2°$, $19.9°$. In particular, this form can be obtained by annealing samples having form I or form IV at temperatures higher than 180° C. (preferably in the range of from 200° to 220° C.), as well as by annealing some clathrate structures at temperatures higher than 150° C. (for instance, by annealing clathrate structures of o-dichlorobenzene at 180° C.).

The semicrystalline manufactured articles made of s-PpMS, and particularly the articles wherein the polymer is in the crystalline form III, exhibit improved thermomechanical properties compared with amorphous manufactured articles. The degree of crystallinity of the manufactured articles generally ranges from 5% to 40%.

A further advantage of the semicrystalline manufactured articles of the invention is the fact that oriented manufactured articles can be easily obtained by means of drawing at temperatures ranging from 100° to 200° C. In contrast, very poorly oriented and substantially amorphous samples are obtained when drawing amorphous s-PpMS manufactured articles, which can be drawn to high draw ratios only at temperatures slightly above $T_g$.

In particular, regardless of the crystalline form of the starting unoriented manufactured article (clathrate, I, II, III or IV), drawing always produce highly oriented manufactured articles (filaments, films, etc.) wherein the polymer is in the same crystalline mesomorphic form IV. The X-ray diffraction spectrum of form IV is characterized by three weak and broad equatorial reflections at $2\theta=6.6°$, $11.3°$, $15.6°$ and a strong layer reflection at $2\theta=20°$, as shown, for instance, in the diffraction spectrum on photographic plate in FIG. 3.

The oriented mesomorphic manufactured articles are endowed with high thermomechanical properties; in particular, their degree of orientation remains unchanged even after long annealings at temperatures as high as 210° C.

The following examples are supplied for merely illustrative and not limitative purposes of the invention.

EXAMPLE 1

A syndiotactic poly-p-methyl-styrene in powder form is prepared according to the method described in Macromolecules, 1989, 22, 104. p-Methyl-styrene (0.5 mmoles) is polymerized in toluene (59 ml) at 50° C. for 24 hours, in the presence of tetrabenzyltitanium (5·10 moles) and methylalumoxane (0.3 g); 8.5 g of s-PpMS are obtained. A film about 100 microns thick is produced by compression molding at a pressure of 2 Kg/cm² and at a temperature of 230° C. An amorphous film is thus obtained.

Exposure of the amorphous film to tetrahydrofuran vapours for 1 minute, in a saturated environment at ambient temperature, is sufficient to originate a semicrystalline sample which has a degree of crystallinity of about 20% and which clathrates solvent molecules in the crystal lattice. The X-ray diffraction spectrum of the sample is shown in FIG. 1B.

Figure 2:
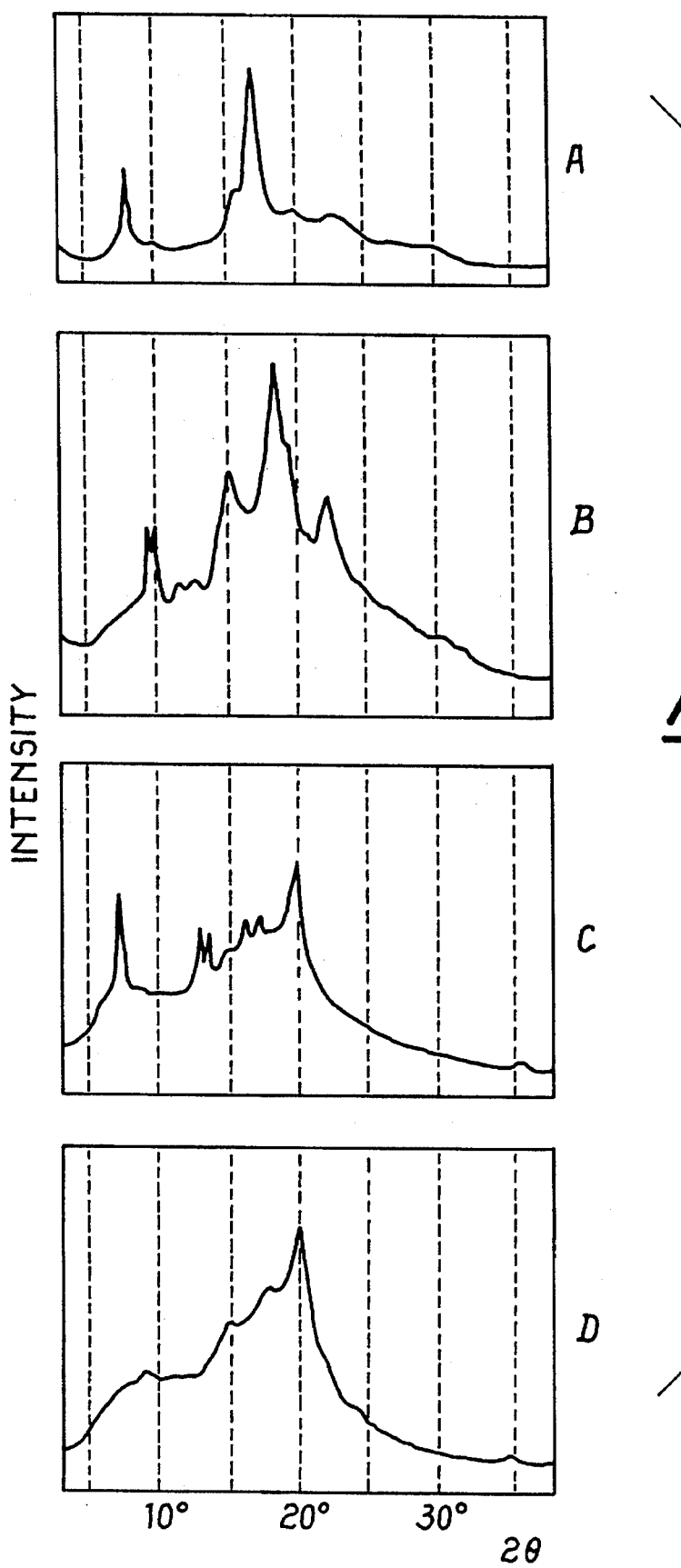
Figure 4:
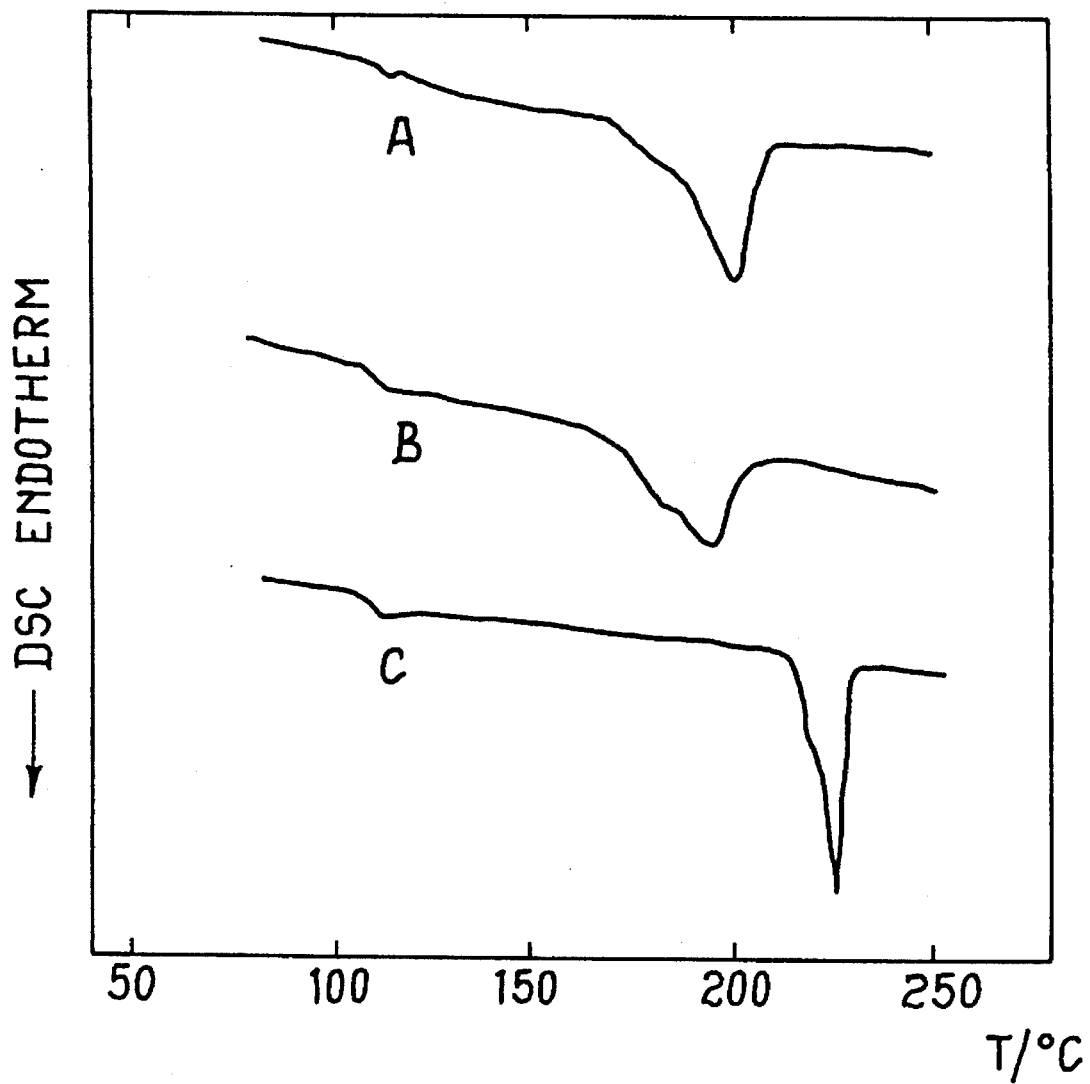
FIG. 4A shows a DSC scan of an annealed film sample of semicrystalline s-PpMS exhibiting the crystalline form III.
FIG. 4B shows a DSC scan of an annealed film sample of semicrystalline s-PpMS exhibiting the crystalline form IV.
FIG. 4C shows a DSC scan of an annealed film sample of semicrystalline s-PpMS exhibiting the crystalline form II.

Annealing of the film at temperatures higher than 90° C. causes complete removal of the solvent and formation of the crystalline form II (X-ray diffraction spectrum shown in FIG. 2B), which has a degree of crystallinity of about 25% and melts without further structural modifications at a temperature of about 200° C., as shown in the DSC scan of FIG. 4C.

In an alternative method, rapid annealing at temperatures higher than 160° C. of a sample of the same film in the crystalline form which clathrates molecules of tetrahydrofuran originates the mesomorphic form IV (X-ray diffraction spectrum shown in FIG. 2D), which has a degree of crystallinity of about 30% and melts without structural modifications at a temperature of about 200° C., as shown in the DSC scan of FIG. 4B.

Further annealing at 210° C. of the sample in the form IV originates a sample exhibiting the crystalline form III (X-ray diffraction spectrum shown in FIG. 2C), which melts at about 224° C. as shown in the DSC scan of FIG. 4A.

Figure 5:
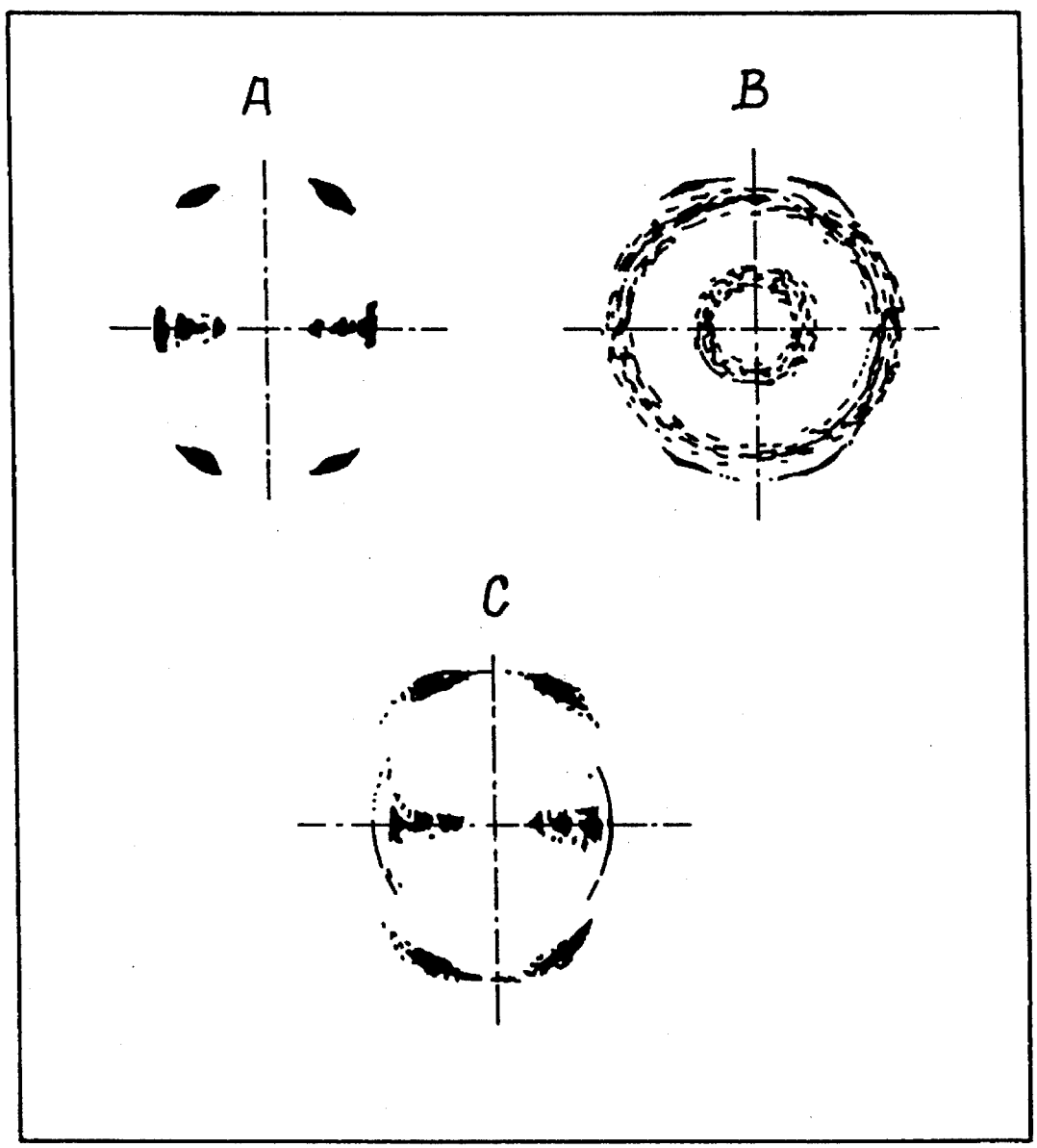
FIG. 5A shows an X-ray diffraction spectrum similar to the spectra of 150% drawn film having the clathrate crystalline structure and the same film in the crystalline forms II, III and IV.
FIG. 5B shows the X-ray diffraction spectrum of an amorphous film sample following 300% drawing at 120° C., but without treatment with THF.
FIG. 5C shows the X-ray diffraction spectrum of the sample of FIG. 5A after free-end annealing for 15 minutes at 210° C.

A 150% drawing of both the film having the clathrate crystalline structure and the same film in the crystalline forms II, III or IV, originates highly oriented and mesomorphic samples, which have X-ray diffraction spectra similar to the spectrum in FIG. 5A.

A 300% drawing at 120° C. of the same amorphous film, i.e. without the treatment with THF, originates a sample having very low molecular orientation and exhibiting limited formation of the mesomorphic form, as shown in the X-ray diffraction spectrum of FIG. 5B.

Mesomorphic oriented samples exhibit dimensional stability up to about 210° C. The X-ray spectrum of the sample of FIG. 5A after free-end annealing for 15 minutes at 210° C. is shown, for instance, in FIG. 5C.

Figure 6:
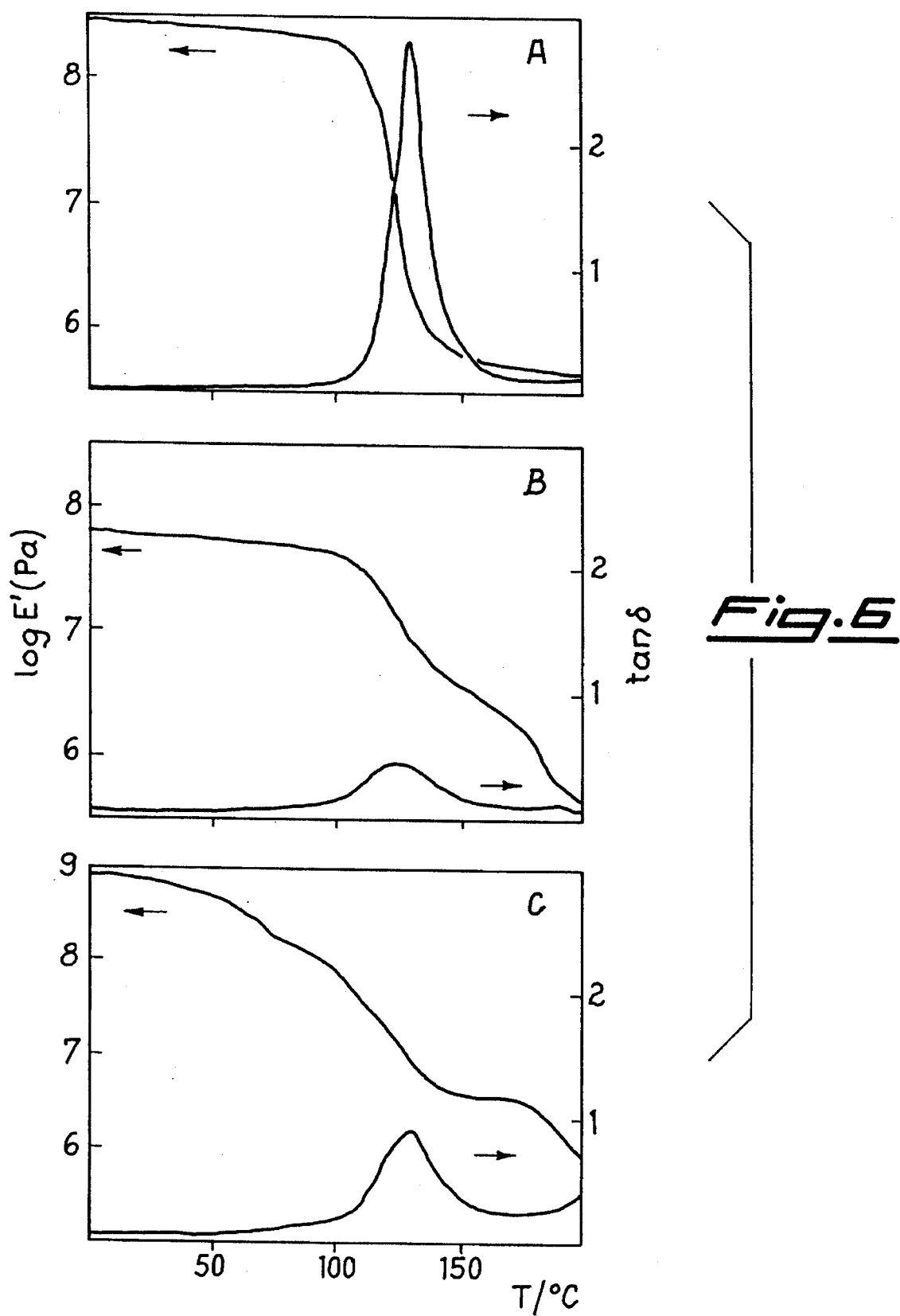
FIGS. 6A, 6B and 6C respectively show the dynamic-mechanical analyses of amorphous unoriented s-PpMS, unoriented s-PpMS in the THF clathrate form and oriented s-PpMS in the mesomorphic form.

The dynamic-mechanical analyses of samples of amorphous unoriented s-PpMS, unoriented s-PpMS in the tetrahydrofuran clathrate form and oriented s-PpMS in the mesomorphic form are shown in FIGS. 6A, 6B, 6C. It is evident that crystallization produces higher elastic moduli in a temperature range comprised between the glass transition temperature and the melting temperature (120°–180° C.).

EXAMPLE 2

The same polymer is used as in Example 1.

An amorphous filament 0.5 mm thick, obtained by extrusion, is kept immersed in dimethylformamide at room temperature for two hours.

Exposure to said solvent causes crystallization of the amorphous polymer in the crystalline form I (FIG. 7A), with a degree of crystallinity of about 20%.

Said filament, when drawn by 120% at 160° C., exhibits an oriented mesomorphic form.

EXAMPLE 3

The same polymer is used as in Example 1.

Figure 7:
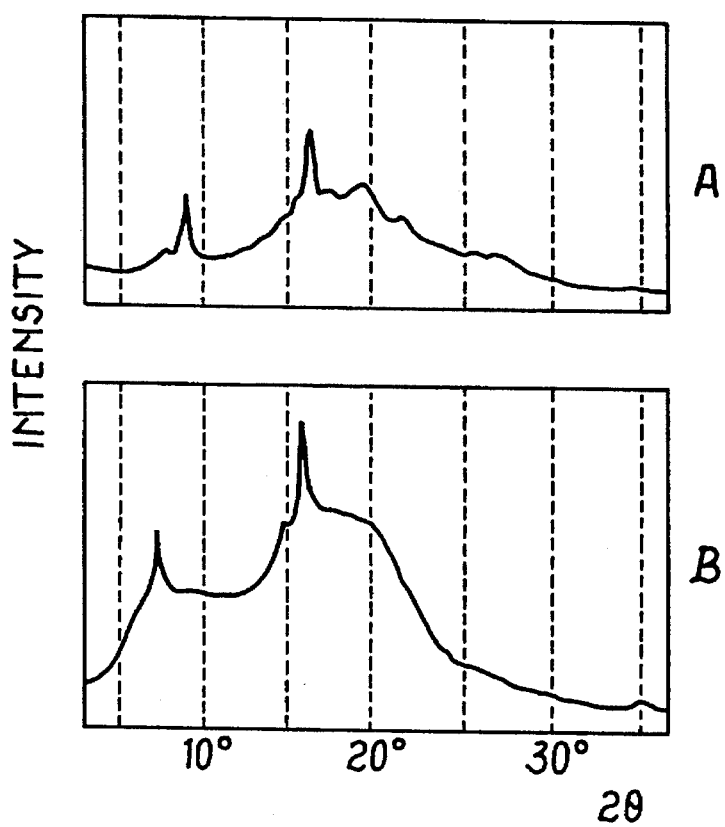
FIG. 7A shows the X-ray diffraction spectrum of a semicrystalline filament sample in the crystalline form I.
FIG. 7B shows the X-ray diffraction spectrum of a semicrystalline filament sample in a clathrate form.

An amorphous filament 0.5 mm thick (obtained as in Example 2) is kept immersed in N-methyl-2-pyrrolidone at ambient temperature for two hours. A semi-crystalline sample in a clathrate form is obtained, with a degree of crystallinity of 10% (FIG. 7B).

Figure 3:
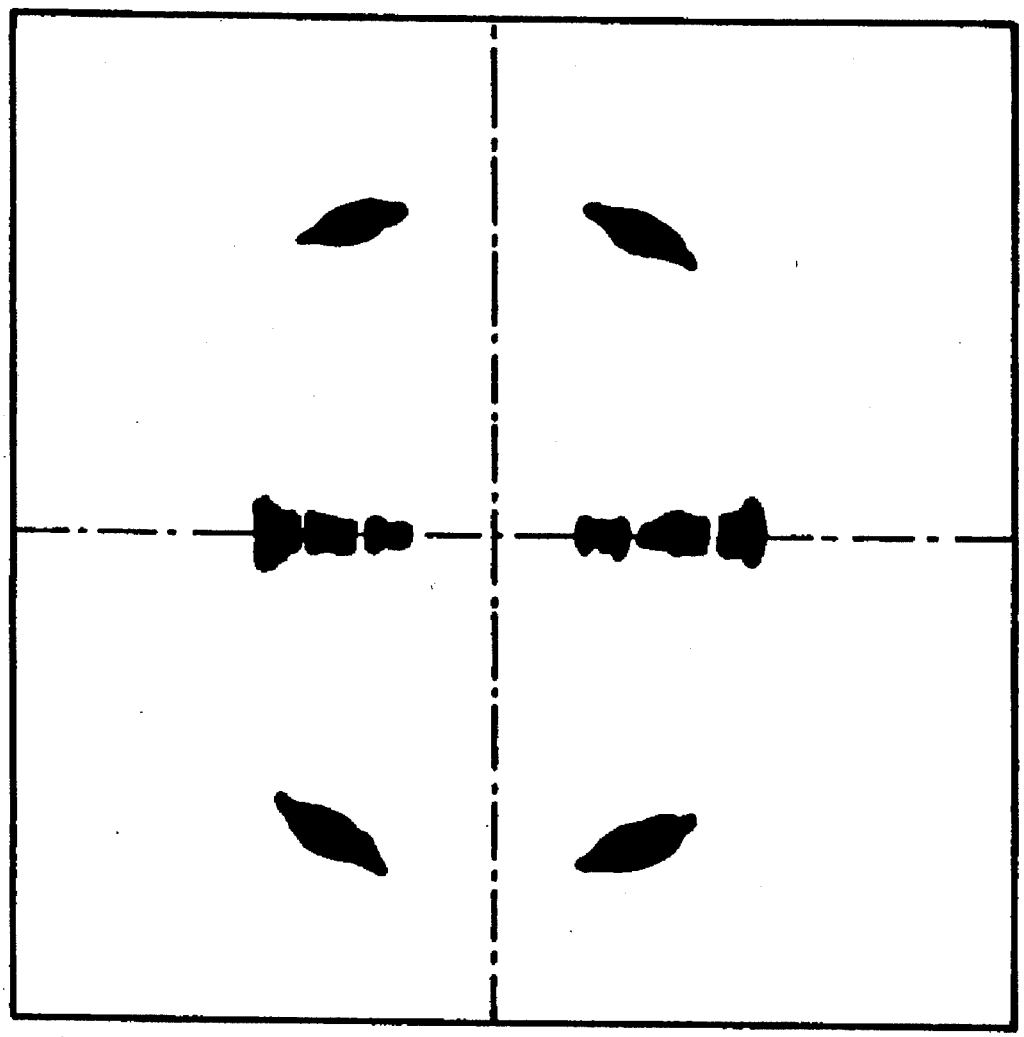
FIG. 3 shows the X-ray diffraction spectrum of the crystalline form IV.

Drawing this filament by 18.0% at 150° C. produces the oriented mesomorphic form, which shows an X-ray diffraction spectrum similar to that of FIG. 3.

We claim:

1. Semicrystalline manufactured articles made of syndiotactic poly-p-methylstyrene wherein the polymer is present in a crystalline form characterized by a melting point of 225° C., and the degree of crystallinity ranges from 5% to 40%.

2. Oriented manufactured articles obtained by drawing the semicrystalline manufactured articles according to claim 1, wherein the syndiotactic poly-p-methylstyrene is present in a crystalline mesomorphic form characterized by three equatorial reflections at $2\theta=6.6°$, $11.3°$ and $15\ 6°$ and by a layer reflection at $2\theta=20°$.

3. Oriented manufactured articles according to claim 2 in the form of films or filaments.

4. Syndiotactic poly-p-methylstyrene in a crystalline form having a melting point of 225° C. and the following X-ray diffraction peaks: $2\theta=7.5°$, $12.8°$, $13.5°$, $16.1°$, $17.2°$ and $19.9°$.

5. Syndiotactic poly-p-methylstyrene in a crystalline form clathrating molecules of an organic solvent in the crystal lattice wherein the organic solvent is tetrahydrofuran.

6. A process for preparing the semi-crystalline manufactured articles according to claim 1, comprising the process step of exposing amorphous manufactured articles of syndiotactic poly-p-methylstyrene to an organic solvent selected from tetrahydrofuran, o-dichlorobenzene, dimethylformamide, dimethyl-acetamide and N-methylpyrrolidone.

7. Process according to claim 6, wherein the organic solvent is tetrahydrofuran in vapour form.

8. A process for preparing semicrystalline manufactured articles having the characteristics indicated in claim 1, wherein amorphous manufactured articles of syndiotactic poly-p-methylstyrene are exposed to an organic solvent selected from tetrahydrofuran, o-dichlorobenzene, dimethylformamide, dimethyl-acetamide and N-methylpyrrolidone, followed by thermal or thermo-mechanical treatment of said articles.

9. A process according to claim 8, wherein the organic solvent is tetrahydrofuran in vapor form.

10. A process for preparing the semi-crystalline manufactured articles according to claim 1, comprising the process steps of exposing amorphous manufactured articles of syndiotactic poly-p-methylstyrene to an organic solvent selected from tetrahydrofuran, o-dichlorobenzene, dimethylformamide, di-methylacetamide and N-methylpyrrolidone and drawing said manufactured articles at a temperature of from 100° to 200° C.

* * * * *